(12) United States Patent
Sebire

(10) Patent No.: US 11,363,487 B2
(45) Date of Patent: Jun. 14, 2022

(54) METHODS AND APPARATUSES FOR QUALITY OF SERVICE FLOW RELOCATION HANDLING

(71) Applicant: Nokia Technologies Oy, Espoo (FI)

(72) Inventor: Benoist Sebire, Tokyo (JP)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/976,233

(22) PCT Filed: Mar. 8, 2019

(86) PCT No.: PCT/FI2019/050184
§ 371 (c)(1),
(2) Date: Aug. 27, 2020

(87) PCT Pub. No.: WO2019/193242
PCT Pub. Date: Oct. 10, 2019

(65) Prior Publication Data
US 2021/0022033 A1    Jan. 21, 2021

Related U.S. Application Data

(60) Provisional application No. 62/651,925, filed on Apr. 3, 2018.

(51) Int. Cl.
*H04W 28/02* (2009.01)
*H04W 36/06* (2009.01)
*H04W 72/08* (2009.01)

(52) U.S. Cl.
CPC ....... *H04W 28/0263* (2013.01); *H04W 36/06* (2013.01); *H04W 72/08* (2013.01)

(58) Field of Classification Search
CPC ............ H04W 28/02; H04W 28/0263; H04W 28/0273; H04W 36/06; H04W 72/08
See application file for complete search history.

(56) References Cited

U.S. PATENT DOCUMENTS 10,511,993 B2    12/2019  Turtinen et al.
2017/0303287 A1  10/2017  Yu et al.
(Continued)

FOREIGN PATENT DOCUMENTS

WO    2018/026169 A1    2/2018
WO    2018/038664 A1    3/2018

OTHER PUBLICATIONS

"3rd Generation Partnership Project; Technical Specification Group Services and System Aspects; System Architecture for the 5G System; Stage 2 (Release 15)", 3GPP TS 23.501, V15.0.0, Dec. 2017, pp. 1-181.
(Continued)

*Primary Examiner* — Khoa Huynh
(74) *Attorney, Agent, or Firm* — Squire Patton Boggs (US) LLP

(57) ABSTRACT

Systems, methods, apparatuses, and computer program products for quality of service (QoS) flow relocation handling are provided. One method includes configuring an alteration rule that alters how packets from a relocated QoS flow are handled on an old bearer when a mapping rule update to a new bearer is provided. The method also includes providing, to at least one user equipment, the mapping rule update to the new bearer.

16 Claims, 3 Drawing Sheets

(56) References Cited

U.S. PATENT DOCUMENTS

2018/0049218 A1 2/2018 Hapsari et al.
2018/0213540 A1* 7/2018 Chiu .................. H04W 28/02
2020/0059817 A1* 2/2020 Baek ............... H04W 28/0252

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.0.0, Dec. 2017, pp. 1-68.
"New QoS Flows on the Default Bearer", 3GPP TSG-RAN WG2 NR Adhoc #2, R2-1706544, Agenda : 10.2.13, Nokia, Jun. 27-29, 2017, 2 pages.
"3rd Generation Partnership Project; Technical Specification Group Radio Access Network; E-UTRA and NR; Service Data Adaptation Protocol (SDAP) specification (Release 15)", 3GPP TS 37.324, V1.2.0, Mar. 2018, pp. 1-11.
International Search Report and Written Opinion received for corresponding Patent Cooperation Treaty Application No. PCT/FI2019/050184, dated May 23, 2019, 15 pages.
"QoS Flow Remapping", 3GPP TSG-RAN WG2 NR Ad hoc 1801, R2-1800539, Agenda : 10.3.4.3, Nokia, Jan. 22-26, 2018, 4 pages.
"3rd Generation Partnership Project; Technical Specification Group Services and System Aspects; System Architecture for the 5G System; Stage 2 (Release 15)", 3GPP TS 23.501, V15.1.0, Mar. 2018, pp. 1-201.

* cited by examiner

METHODS AND APPARATUSES FOR QUALITY OF SERVICE FLOW RELOCATION HANDLING

RELATED APPLICATION

This application was originally filed as PCT Application No. PCT/FI2019/050184 on Mar. 8, 2019, which claims priority from U.S. Provisional Application No. 62/651,925, filed on Apr. 3, 2018, which is hereby incorporated in its entirety.

FIELD

Some example embodiments may generally relate to mobile or wireless telecommunication systems, such as Long Term Evolution (LTE) or fifth generation (5G) radio access technology or new radio (NR) access technology. Certain embodiments may relate to 5G quality of service (QoS).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method that may include configuring an alteration rule that alters how packets from a relocated QoS flow are handled on an old bearer when a mapping rule update to a new bearer is provided. In an embodiment, the method may also include explicitly or implicitly providing, to one or more UE(s), the mapping rule update to the new bearer. According to one example, the mapping rule update may include the alteration rule that indicates how the packets from the relocated QoS flow are handled on the old bearer. According to another example, the alteration rule may be implicitly linked to the new bearer type.

Another embodiment is directed to an apparatus that may include at least one processor and at least one memory comprising computer program code. The at least one memory and computer program code may be configured, with the at least one processor, to cause the apparatus at least to configure an alteration rule that alters how packets from a relocated QoS flow are handled on an old bearer when a mapping rule update to a new bearer is provided. In an embodiment, the at least one memory and computer program code may also be configured, with the at least one processor, to cause the apparatus at least to explicitly or implicitly provide, to one or more UE(s), the mapping rule update to the new bearer. According to one example, the mapping rule update may comprise the alteration rule that indicates how the packets from the relocated QoS flow are handled on the old bearer. According to another example, the alteration rule may be implicitly linked to the new bearer type.

Another embodiment is directed to an apparatus that may include configuring means for configuring an alteration rule that alters how packets from a relocated QoS flow are handled on an old bearer when a mapping rule update to a new bearer is provided. In an embodiment, the apparatus may also include providing means for explicitly or implicitly providing, to one or more UE(s), the mapping rule update to the new bearer. According to one example, the mapping rule update may include the alteration rule that indicates how the packets from the relocated QoS flow are handled on the old bearer. According to another example, the alteration rule may be implicitly linked to the new bearer type.

Another embodiment is directed to a method that may include receiving, from a network node, a mapping rule update to a new bearer. In an embodiment, the method may also include, responsive to receiving the mapping rule update, applying an alteration rule for how the packets from the relocated QoS flow are handled on the old bearer.

Another embodiment is directed to an apparatus that may include at least one processor and at least one memory comprising computer program code. The at least one memory and computer program code may be configured, with the at least one processor, to cause the apparatus at least to receive, from a network node, a mapping rule update to a new bearer and, responsive to receiving the mapping rule update, apply an alteration rule for how the packets from the relocated QoS flow are handled on the old bearer.

Another embodiment is directed to an apparatus that may include receiving means for receiving, from a network node, a mapping rule update to a new bearer. In an embodiment, the apparatus may also include applying means for applying, responsive to receiving the mapping rule update, an alteration rule for how the packets from the relocated QoS flow are handled on the old bearer.

BRIEF DESCRIPTION OF THE DRAWINGS

For proper understanding of example embodiments, reference should be made to the accompanying drawings, wherein.

DETAILED DESCRIPTION

Figure 1:
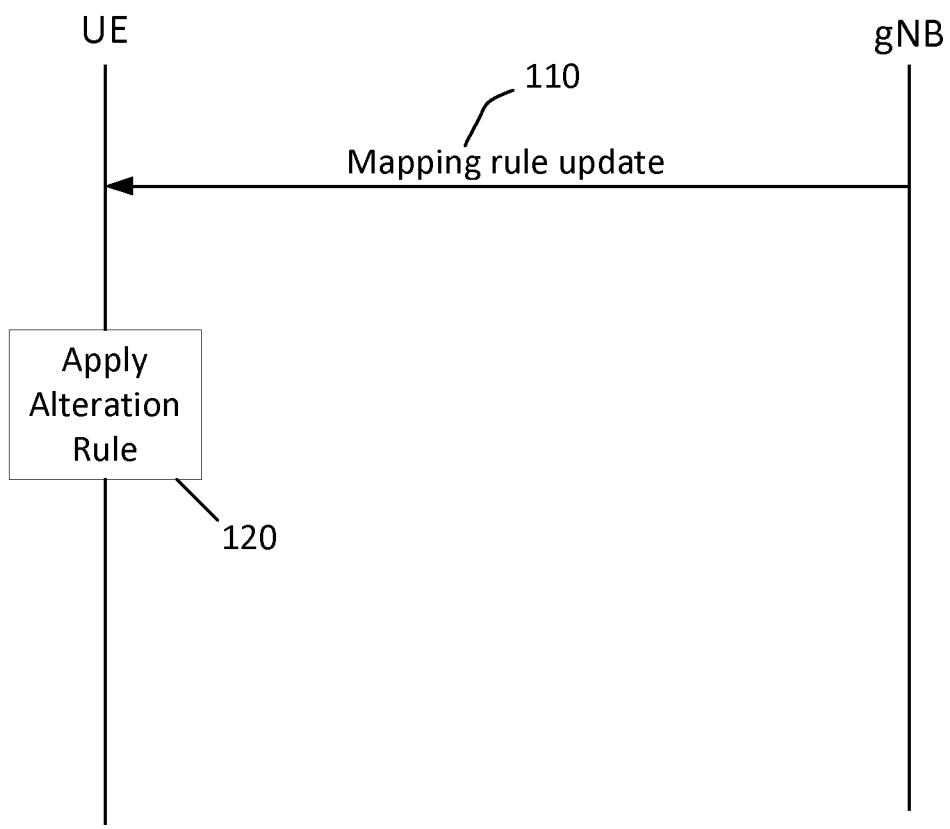
FIG. 1 illustrates an example signaling diagram, according to an example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for QoS flow relocation handling, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain embodiments may relate to the 5G QoS model, which is specified in the $3^{rd}$ generation partnership project (3GPP) technical specification (TS) 23.501 (chapter 5.7) and TS 38.300 (chapter 8). Unlike in LTE, 5G RAN controls data radio bearers (DRBs) independently from the core network. 5G RAN decides on the DRB configuration and how end-to-end QoS flows are mapped to DRBs.

One of the design targets for the 5G QoS framework included the reduction of control plane (C-plane) signalling. As a result, first SA2 specified reflective QoS (RQoS) for service data flow to QoS flow mapping—non-access stratum (NAS) layer mapping—and later RAN2 adopted RQoS for QoS flow to DRB mapping—access stratum (AS) layer mapping. With reflective QoS, a UE can derive uplink (UL) mapping filters and mapping rules by itself from the downlink (DL) traffic, so the network signalling over the C-plane is not needed. For reflective QoS, the QoS flow identifier (ID) is included in DL radio packets and the UE is provided an indication on which layer (NAS or AS) the reflective QoS should be performed with the packet (See, e.g., 3GPP TS 37.324). When there is no mapping rules in the UL, the default bearer is used to convey the flows.

3GPP TS 38.300 provides a description of this approach:

"At Access Stratum level, the data radio bearer (DRB) defines the packet treatment on the radio interface (Uu). A DRB serves packets with the same packet forwarding treatment. The QoS flow to DRB mapping by NG-RAN is based on QFI and the associated QoS profiles (i.e. QoS parameters and QoS characteristics). Separate DRBs may be established for QoS flows requiring different packet forwarding treatment, or several QoS Flows belonging to the same PDU session can be multiplexed in the same DRB.

In the uplink, the NG-RAN may control the mapping of QoS Flows to DRB in two different ways:

Reflective mapping: for each DRB, the UE monitors the QFI(s) of the downlink packets and applies the same mapping in the uplink; that is, for a DRB, the UE maps the uplink packets belonging to the QoS flows(s) corresponding to the QFI(s) and PDU Session observed in the downlink packets for that DRB. To enable this reflective mapping, the NG-RAN marks downlink packets over Uu with QFI.

Explicit Configuration: besides the reflective mapping, the NG-RAN may configure by RRC an uplink "QoS Flow to DRB mapping".

The UE shall always apply the latest update of the mapping rules regardless of whether it is performed via reflecting mapping or explicit configuration.

In the downlink, the QFI is signalled by NG-RAN over Uu for the purpose of RQoS and if neither NG-RAN, nor the NAS (as indicated by the RQA) intend to use reflective mapping for the QoS flow(s) carried in a DRB, no QFI is signalled for that DRB over Uu. In the uplink, NG-RAN can configure the UE to signal QFI over Uu.

For each PDU session, a default DRB is configured. If an incoming UL packet matches neither an RRC configured nor a reflective "QoS Flow ID to DRB mapping", the UE shall map that packet to the default DRB of the PDU session. Within each PDU session, it is up to NG-RAN how to map multiple QoS flows to a DRB. The NG-RAN may map a GBR flow and a non-GBR flow, or more than one GBR flow to the same DRB, but mechanisms to optimise these cases are not within the scope of standardization. The timing of establishing non-default DRB(s) between NG-RAN and UE for QoS flow configured during establishing a PDU session can be different from the time when the PDU session is established. It is up to NG-RAN when non-default DRBs are established."

In summary, a QoS flow can be relocated from an "old bearer" to a "new bearer" by updating the mapping rules either explicitly or implicitly. However, a problem may arise when dealing with packets of a QoS flow after receiving a mapping rule update.

Thus, to allow for smooth QoS flow relocation and/or efficient RQoS, one example embodiment may alter how the packets from a relocated QoS flow are handled on the old bearer once a mapping rule update to a new bearer is received. According to certain embodiments, the mapping rule update, which may be either explicit or implicit, may serve as a trigger for the alteration of how the packets from the relocated QoS flow are handled on the old bearer.

According to another embodiment, the alteration rule may vary and may be controlled by the network through configuration, for example. In some example embodiments, at least one of the following three alteration rules may be provided: (1) do nothing, (2) prioritise, and/or (3) discard. According to certain embodiments, the alteration rules may be explicitly signalled as a part of the mapping rule update, or implicitly linked to the new bearer type. For instance, in an example embodiment, a QoS flow relocation to a radio bearer with a radio link control (RLC) entity configured as unacknowledged mode (UM) may trigger a discard of old protocol data units (PDUs) on the old bearer.

In one example embodiment, a default rule may be configured (e.g., prioritise) and then if a new rule is received some other behaviour could apply. As just one example, the default rule may be to prioritise and then, if an alteration rule to discard is received, the discard behaviour may subsequently be applied. Of course, this is just one example and other examples may also be applied according to other embodiments.

FIG. 1 illustrates an example signaling diagram, according to one embodiment. As illustrated in the example of FIG. 1, a network node, such as a gNB, may transmit at 110, to one or more UE(s), a mapping rule update to a new bearer. It is noted that, while the example embodiment FIG. 1 depicts an explicit mapping rule update that is transmitted to the UE(s), an implicit mapping rule update may be provided in other example embodiments. Responsive to receiving the mapping rule update, the UE(s) may apply, at 120, an alteration rule for how packets from a relocated QoS flow are handled on an old bearer. In some embodiments, the alteration rule may be explicitly signaled in the mapping rule update, or the alteration rule may be implicitly linked to the new bearer type. In certain examples, the alteration rule may include at least one of: (1) do nothing, (2) prioritise, and/or (3) discard. In one example, a default alteration rule may be configured and, then if a new alteration rule is received, some other behaviour could apply according to the newly received alteration rule.

Figure 2A:
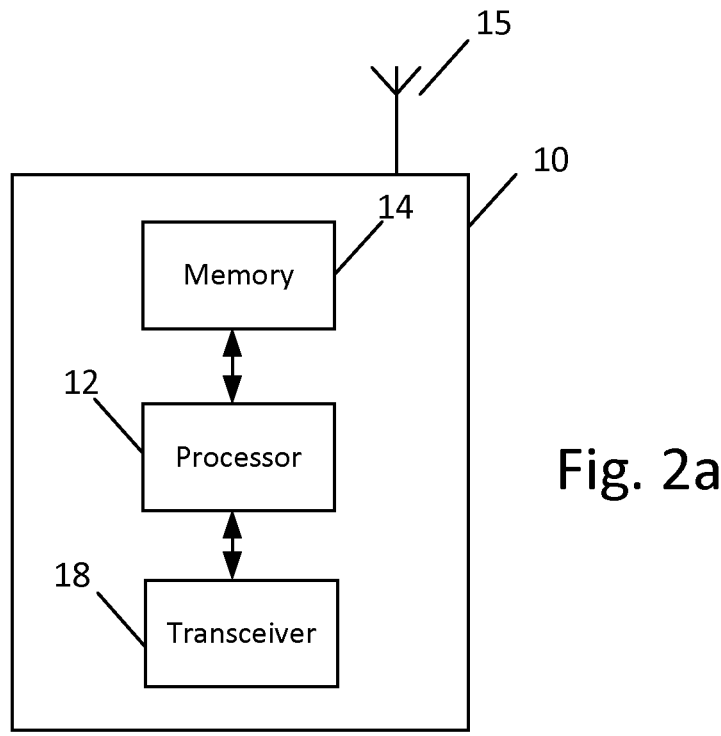
FIG. 2a illustrates an example block diagram of an apparatus, according to an embodiment.

FIG. 2a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 2a.

As illustrated in the example of FIG. 2a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 2a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagram illustrated in FIG. 1. For example, in certain embodiments, apparatus 10 may be controlled by memory 14 and processor 12 to perform one or more of the steps illustrated in FIG. 1, or in FIG. 3 discussed below. In certain embodiments, apparatus 10 may be configured to perform a procedure for QoS flow relocation handling.

For instance, in one embodiment, apparatus 10 may be controlled by memory 14 and processor 12 to provide, to one or more UE(s), a mapping rule update to a new bearer. In an example embodiment, the mapping rule update may trigger a change in how packets from a relocated QoS flow are handled on the old bearer in the UE. According to certain embodiments, apparatus 10 may be controlled by memory 14 and processor 12 to transmit an explicit mapping rule update to the UE(s). In other example embodiments, apparatus 10 may be controlled by memory 14 and processor 12 to provide an implicit mapping rule update to the UE(s).

In some embodiments, the mapping rule update may include an alteration rule that indicates how the packets from the relocated QoS flow are handled on the old bearer. According to other example embodiments, the alteration rule may be implicitly linked to the new bearer type. As an example, the alteration rule may include at least one of: (1) do nothing, (2) prioritise, and/or (3) discard. In one embodiment, apparatus 10 may be controlled by memory 14 and processor 12 to configure a default alteration rule and, then if a new alteration rule is transmitted (or implicitly provided), some other behaviour could apply based on the new alteration rule.

Figure 2B:
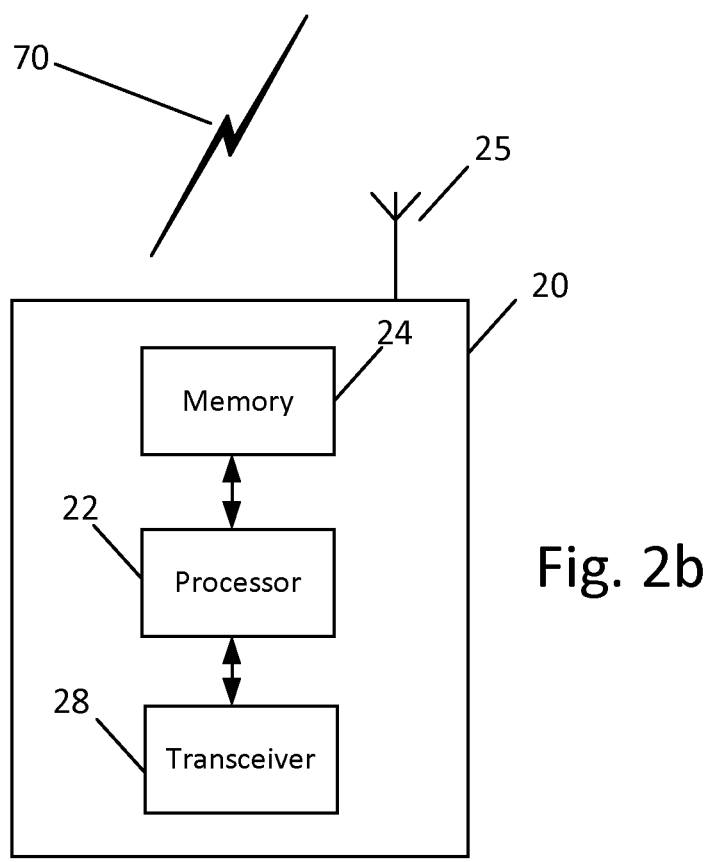
FIG. 2b illustrates an example block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 2b.

As illustrated in the example of FIG. 2b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 2b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIG. 1, or in FIG. 3 discussed below. For example, in certain embodiments, apparatus 20 may be configured to perform a procedure for QoS flow relocation handling.

According to some embodiments, apparatus 20 may be controlled by memory 24 and processor 22 to receive, from a network node (e.g., gNB), a mapping rule update to a new bearer, which may trigger a change in how packets from a relocated QoS flow are handled on the old bearer. For example, in an embodiment, apparatus 20 may be controlled by memory 24 and processor 22 to, responsive to receiving the mapping rule update, apply an alteration rule for how the packets from the relocated QoS flow are handled on the old bearer. According to certain embodiments, apparatus 20 may be controlled by memory 24 and processor 22 to receive an explicit mapping rule update from the network. However, in other example embodiments, apparatus 20 may be controlled by memory 24 and processor 22 to receive an implicit mapping rule update.

In some embodiments, the mapping rule update may include the alteration rule that indicates how the packets from the relocated QoS flow are handled on the old bearer. According to other example embodiments, the alteration rule may be implicitly linked to the new bearer type. As an example, the alteration rule may include at least one of: (1) do nothing, (2) prioritise, and/or (3) discard. In one embodiment, apparatus 20 may be controlled by memory 24 and processor 22 to apply a default alteration rule and, then if a new alteration rule is received (or implicitly provided), apparatus 20 may be controlled by memory 24 and processor 22 to apply some other behaviour based on the new alteration rule.

Figure 3A:
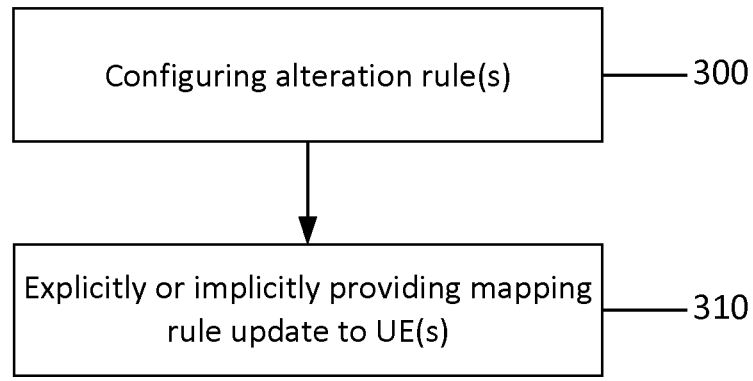
FIG. 3a illustrates an example flow diagram of a method, according to an embodiment.

FIG. 3a illustrates an example flow diagram of a method for QoS flow relocation handling, according to one embodiment. In certain embodiments, the flow diagram of FIG. 3a may be performed by a network node, such as a base station, node B, eNB, gNB, or any other access node. As illustrated in the example of FIG. 3a, the method may optionally include, at 300, configuring an alteration rule that alters how the packets from a relocated QoS flow are handled on the old bearer when a mapping rule update to a new bearer is provided. In an embodiment, the method may also include, at 310, explicitly or implicitly providing, to one or more UE(s), the mapping rule update to a new bearer. In an example embodiment, the mapping rule update may trigger the change in how packets from the relocated QoS flow are handled on the old bearer. In some embodiments, the mapping rule update may include the alteration rule that indicates how the packets from the relocated QoS flow are handled on the old bearer. According to other example embodiments, the alteration rule may be implicitly linked to the new bearer type. As an example, the alteration rule may include at least one of: (1) do nothing, (2) prioritise, and/or (3) discard. In one embodiment, the method may also include configuring a default alteration rule and, then if a new alteration rule is transmitted (or implicitly provided), some other behaviour could apply based on the new alteration rule.

Figure 3B:
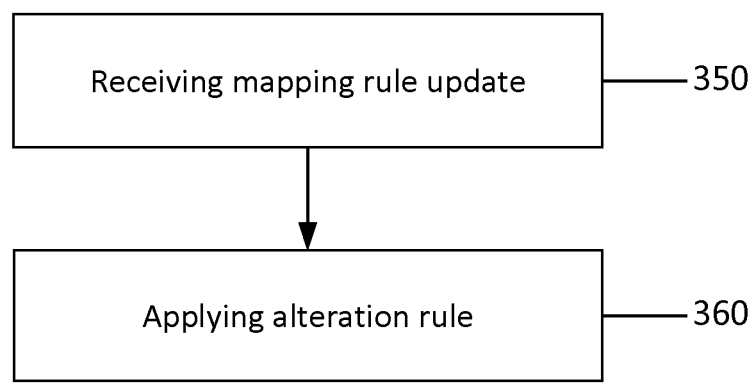
FIG. 3b illustrates an example flow diagram of a method, according to another embodiment.

FIG. 3b illustrates an example flow diagram of a method for QoS flow relocation handling, according to another embodiment. In certain embodiments, the flow diagram of FIG. 3b may be performed by a UE, mobile station, mobile equipment, IoT device, or the like. As illustrated in the example of FIG. 3b, the method may include, at 350, receiving, from a network node (e.g., gNB), a mapping rule update to a new bearer, which may trigger a change in how packets from a relocated QoS flow are handled on the old bearer. In an embodiment, the method may also include, responsive to receiving the mapping rule update, applying an alteration rule, at 360, for how the packets from the relocated QoS flow are handled on the old bearer. According to certain embodiments, the receiving 350 may include receiving an explicit mapping rule update from the network. However, in other example embodiments, the receiving 350 may include receiving an implicit mapping rule update.

In some embodiments, the receiving 350 may include receiving the mapping rule update which may include the alteration rule that indicates how the packets from the relocated QoS flow are handled on the old bearer. According to other example embodiments, the alteration rule may be implicitly linked to the new bearer type. As an example, the alteration rule may include at least one of: (1) do nothing, (2) prioritise, and/or (3) discard. In one embodiment, the method may include applying a default alteration rule and, then when a new alteration rule is received (or implicitly provided), the method may include applying some other behaviour based on the new alteration rule.

Therefore, certain example embodiments provide several technical improvements, enhancements, and/or advantages. Various example embodiments can, for example, allow QoS flow relocation to be smarter and reduce delays whenever possible. Certain embodiments also have the benefit of reducing buffering requirements, e.g., when discard takes place. Consequently, certain example embodiments improve the reliability and speed of networks. As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One embodiment is directed to a method that may include configuring an alteration rule that alters how packets from a relocated QoS flow are handled on an old bearer when a mapping rule update to a new bearer is provided. In an embodiment, the method may also include explicitly or implicitly providing, to one or more UE(s), the mapping rule update to the new bearer. According to one example, the mapping rule update may include the alteration rule that indicates how the packets from the relocated QoS flow are handled on the old bearer. According to another example, the alteration rule may be implicitly linked to the new bearer type.

Another embodiment is directed to an apparatus that may include at least one processor and at least one memory comprising computer program code. The at least one memory and computer program code may be configured, with the at least one processor, to cause the apparatus at least to configuring an alteration rule that alters how packets from a relocated QoS flow are handled on an old bearer when a mapping rule update to a new bearer is provided. In an embodiment, the method may also include explicitly or implicitly providing, to one or more UE(s), the mapping rule update to the new bearer. According to one example, the mapping rule update may comprise the alteration rule that indicates how the packets from the relocated QoS flow are handled on the old bearer. According to another example, the alteration rule may be implicitly linked to the new bearer type.

Another embodiment is directed to an apparatus that may include configuring means for configuring an alteration rule that alters how packets from a relocated QoS flow are handled on an old bearer when a mapping rule update to a new bearer is provided. In an embodiment, the apparatus may also include providing means for explicitly or implicitly providing, to one or more UE(s), the mapping rule update to the new bearer. According to one example, the mapping rule update may include the alteration rule that indicates how the packets from the relocated QoS flow are handled on the old bearer. According to another example, the alteration rule may be implicitly linked to the new bearer type. Another embodiment is directed to a method that may include receiving, from a network node, a mapping rule update to a new bearer. In an embodiment, the method may also include, responsive to receiving the mapping rule update, applying an alteration rule for how the packets from the relocated QoS flow are handled on the old bearer.

Another embodiment is directed to an apparatus that may include at least one processor and at least one memory comprising computer program code. The at least one memory and computer program code may be configured, with the at least one processor, to cause the apparatus at least to receive, from a network node, a mapping rule update to a new bearer and, responsive to receiving the mapping rule update, apply an alteration rule for how the packets from the relocated QoS flow are handled on the old bearer.

Another embodiment is directed to an apparatus that may include receiving means for receiving, from a network node, a mapping rule update to a new bearer. In an embodiment, the apparatus may also include applying means for applying, responsive to receiving the mapping rule update, an alteration rule for how the packets from the relocated QoS flow are handled on the old bearer.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

The invention claimed is:

1. An apparatus, comprising:
at least one processor; and
at least one memory comprising computer program code,
the at least one memory and computer program code configured, with the at least one processor, to perform at least:
configure an alteration rule that alters how packets from a relocated quality of service flow are handled on an old bearer when a mapping rule update to a new bearer is provided;
provide, to at least one user equipment, the mapping rule update to the new bearer, wherein the mapping rule update triggers the change in how the packets from the relocated quality of service flow are handled on the old bearer, and wherein the mapping rule update comprises the alteration rule that indicates how the packets from the relocated quality of service flow are handled on the old bearer.

2. The apparatus according to claim 1, wherein the at least one memory and computer program code are configured, with the at least one processor, to perform at least: explicitly or implicitly provide the mapping rule update to the new bearer.

3. The apparatus according to claim 1, wherein the alteration rule is implicitly linked to the new bearer type.

4. The apparatus according to claim 1, wherein the alteration rule comprises at least one of: do nothing, prioritize, or discard.

5. A method, comprising:
receiving, from a network node, a mapping rule update to a new bearer, wherein the mapping rule update triggers a change in how packets from a relocated quality of service flow are handled on an old bearer;
responsive to receiving the mapping rule update, applying an alteration rule for how the packets from the relocated quality of service flow are handled on the old bearer,
wherein the receiving of the mapping rule update comprises receiving the mapping rule update comprising the alteration rule that indicates how the packets from the relocated quality of service flow are handled on the old bearer.

6. The method according to claim 5, wherein the receiving of the mapping rule update comprises receiving an explicit mapping rule update from the network node.

7. The method according to claim 5, wherein the receiving of the mapping rule update comprises receiving an implicit mapping rule update from the network node.

8. The method according to claim 5, wherein the alteration rule is implicitly linked to the new bearer type.

9. The method according to claim 5, wherein the alteration rule comprises at least one of: do nothing, prioritize, or discard.

10. The method according to claim 5, wherein the applying comprises applying a default alteration rule and, when a new alteration rule is received or implicitly provided, the method comprises applying some other behavior based on the new alteration rule.

11. An apparatus, comprising:
at least one processor; and
at least one memory comprising computer program code,
the at least one memory and computer program code configured, with the at least one processor, to perform at least:
receive, from a network node, a mapping rule update to a new bearer, wherein the mapping rule update triggers a change in how packets from a relocated quality of service flow are handled on an old bearer;
responsive to receiving the mapping rule update, apply an alteration rule for how the packets from the relocated quality of service flow are handled on the old bearer,
wherein the mapping rule update comprises the alteration rule that indicates how the packets from the relocated quality of service (QoS) flow are handled on the old bearer.

12. The apparatus according to claim 11, wherein the at least one memory and computer program code are configured, with the at least one processor, to perform at least: receive an explicit mapping rule update from the network node.

13. The apparatus according to claim 11, wherein the at least one memory and computer program code are configured, with the at least one processor, to perform at least: receive an implicit mapping rule update from the network node.

14. The apparatus according to claim 11, wherein the alteration rule is implicitly linked to the new bearer type.

15. The apparatus according to claim 11, wherein the alteration rule comprises at least one of: do nothing, prioritize, or discard.

16. The apparatus according to claim 11, wherein the at least one memory and computer program code are configured, with the at least one processor, to perform at least: apply a default alteration rule and, when a new alteration rule is received or implicitly provided, apply some other behavior based on the new alteration rule.

* * * * *